United States Patent [19]

Ikushima et al.

[11] Patent Number: 5,207,740
[45] Date of Patent: May 4, 1993

[54] CONTROL DEVICE FOR AUTOMATIC TRANSMISSION

[75] Inventors: Shunsuke Ikushima; Atsuo Ohno, both of Yokohama; Yasushi Asano, Kosai; Yoshimasa Kataumi, Kosai; Norio Togano, Kosai; Hiroshi Sakon, Kosai, all of Japan

[73] Assignees: Fujikiko Kabushiki Kaisha; Nissan Motor Co., Ltd., Japan

[21] Appl. No.: 706,951

[22] Filed: May 28, 1991

[30] Foreign Application Priority Data

May 30, 1990 [JP] Japan .................. 2-55925[U]
May 30, 1990 [JP] Japan .................. 2-138518
May 30, 1990 [JP] Japan .................. 2-138519

[51] Int. Cl.⁵ .................. F16H 59/04; B60K 41/26
[52] U.S. Cl. .................. 192/4 A; 74/473 R; 74/475
[58] Field of Search .......... 192/4 A; 74/473 R, 473 P, 74/475

[56] References Cited

U.S. PATENT DOCUMENTS

| | | | |
|---|---|---|---|
| 4,365,522 | 12/1982 | Kubota et al. | 74/475 |
| 4,513,276 | 4/1985 | Kubota et al. | 74/473 R X |
| 4,612,820 | 9/1986 | Behrens | 74/473 R X |
| 4,880,092 | 11/1989 | Kito et al. | 74/475 X |
| 5,029,680 | 7/1991 | Kobayashi et al. | 74/475 X |
| 5,079,966 | 1/1992 | Ishizuki et al. | 74/473 R |
| 5,080,208 | 1/1992 | Sakuma et al. | 74/475 X |
| 5,085,096 | 2/1992 | Behrens | 74/475 |

FOREIGN PATENT DOCUMENTS 0307846 9/1988 European Pat. Off.
378244 7/1990 European Pat. Off. .......... 74/473 P
3048093 9/1981 Fed. Rep. of Germany.

Primary Examiner—Allan D. Herrmann
Attorney, Agent, or Firm—Hopkins & Thomas

[57] ABSTRACT

A control device for an automatic transmission is disclosed. The control device is provided with a base member mounted on a vehicle body. A shift lever is pivotably supported by the base member. A guide structure and a check structure and a shaft-locking device are mounted on the base member. The shift lever is provided with a positioning pin movable in the axial direction of the shift lever. A guide structure for guiding the shift lever is provided with a positioning plate having a parking position part and a moving position part engaging the positioning pin. The positioning plate is provided with a buffer member at the moving position part. The check structure for moderating motion of the shift lever has a plurality of positioning recesses on the positioning plate and a check arm for contacting the positioning recesses. The shift-locking device for locking the shift lever is provided with a rotary bushing for blocking disengagement of the positioning pin from the parking position part and a shift-lock solenoid for pivoting the rotary bushing when releasing the shift-lock. The rotary bushing and the shift-lock solenoid are mounted on the base member.

15 Claims, 5 Drawing Sheets

CONTROL DEVICE FOR AUTOMATIC TRANSMISSION

BACKGROUND OF THE INVENTION

1. Field of the Invention

The present invention relates to a control device for an automatic transmission and more particularly to a control device for an automatic transmission suitable for a vehicle such as an automobile.

2. Description of the Prior Art

This kind of control device for an automatic transmission is provided with a shift-locking device which locks a shift lever for safety when the shift lever is positioned in a parking position and a brake pedal is not depressed.

The shift lever comprises a control lever pivotably mounted on a base bracket, and a compression rod contained by the control lever in a slidable manner in the axial direction and mounted with a positioning pin in the direction vertical to the above axis. The control lever is provided with a guide slot at the peripheral portion for guiding the movement of the positioning pin.

The control device also comprises a positioning plate with a plurality of positioning recesses for engaging the positioning pin to keep the shift lever in the parking position or in the driving positions.

The shift lever is mounted with a ball selectively and elastically engaged in a plurality of check recesses of the positioning plate secured to the base bracket to moderate the motion of the shift lever.

The shift-lock device comprises a rotary bushing fitted on the control lever in a freely pivotable and axially immovable manner, and a shift-lock solenoid for pivoting the rotary bushing to a lock release position, mounted on the control lever through a mounting bracket.

According to this configuration when the shift lever is positioned in the parking position, the descent of the positioning pin is blocked by the rotary bushing, so that the shift lever is shift-locked. In this shift-locking condition, when the break pedal is pressed, the shift-lock solenoid acts to pivot the rotary bushing to the lock release position to release the shift-lock.

However, in the conventional control device for an automatic transmission, because the rotary bushing is mounted on the shift lever as a movable member, the shape of the rotary bushing is restricted by the shape of the shift lever. In addition, because the diameter of the shift lever as a pivot is large, the pivotal friction is large and the rotary bushing is inclined to produce a noise during operation resulting from a wobble.

Moreover, because the shift-lock solenoid is mounted on the shift lever as a movable member, the wire must be long enough to prevent breakage. Therefore, the number of clips increases, thus raising the production costs. In addition, because the shift-lock solenoid moves together with the shift lever, the shift-lock solenoid requires enough space to move, and hence, the whole device must be a large size.

Further, because the positioning pin of the positioning plate and the positioning recesses are made of metal, when shifting the shift lever, the positioning pin contacts the positioning recesses causing an unpleasant metallic noise, which can distract the driver.

Furthermore, when the shift lever is shifted, the ball of the shift lever contacts the check recess causing an unpleasant metallic noise.

SUMMARY OF THE INVENTION

An object of this invention is to eliminate or improve the defects or drawbacks encountered in the prior art and to provide a control device for an automatic transmission with a rotary bushing mounted on a portion other than the shift lever as a movable member, so that the rotary bushing may be freely formed independent of the shape of the shift lever.

Another object of this invention is to provide a control device for an automatic transmission with a rotary bushing having a small diameter pivot shaft as a pivot for the rotary bushing, so that the pivotal friction may be small and the rotary bushing may be prevented from producing a noise during operation resulting from a wobble when shift-locking.

A further object of this invention is to provide a control device for an automatic transmission with a shift-lock solenoid mounted in a space on a base bracket as a fixed member, so that the length of a wire may be as short as possible and the number of clips to fasten the wire may be decreased to reduce production costs.

A still further object of this invention is to provide a control device for an automatic transmission with a shift-lock solenoid not requiring a special operating space, so that the whole device can be small.

A still further object of this invention is to provide a control device for an automatic transmission with a guide structure having a buffer member made of synthetic resin, so that the guide structure is prevented from producing a noise through metallic contact.

Still another object of this invention is to provide a control device for an automatic transmission with a check structure having a check arm made of synthetic resin, so that the check structure is prevented from producing a noise through metallic contact.

These and other objects can be achieved according to this invention by providing a control device for an automatic transmission, comprising: a base member mounted on a vehicle body; a shift lever pivotably supported by the base member, comprising a positioning member movable in the axial direction of the shift lever; a guide structure for guiding the shift lever, comprising a guide member having a parking position part and a moving position part for engaging the positioning member, the guide member provided with a buffer member at the moving position part; a check structure for moderating motion of the shift lever, comprising a check member and a check arm contacting the check member; and a shift-locking device for locking the shift lever, comprising a rotary bushing for blocking disengagement of the positioning member from the parking position part, the rotary bushing pivotably mounted on a fixed member other than the shift lever, and a shift-lock solenoid for pivoting the rotary bushing when releasing the shift-lock, the shift-lock solenoid mounted on a fixed part on the base member.

In a preferred embodiment, the buffer member is made of synthetic resin and is positioned at a contact side with the positioning member in the moving position. The buffer member has a slot for buffering the shock when the positioning member contacts the buffer member. The check arm is made of synthetic resin and has a contact member made of synthetic resin.

DETAILED DESCRIPTION OF THE PREFERRED EMBODIMENTS

Figure 1:
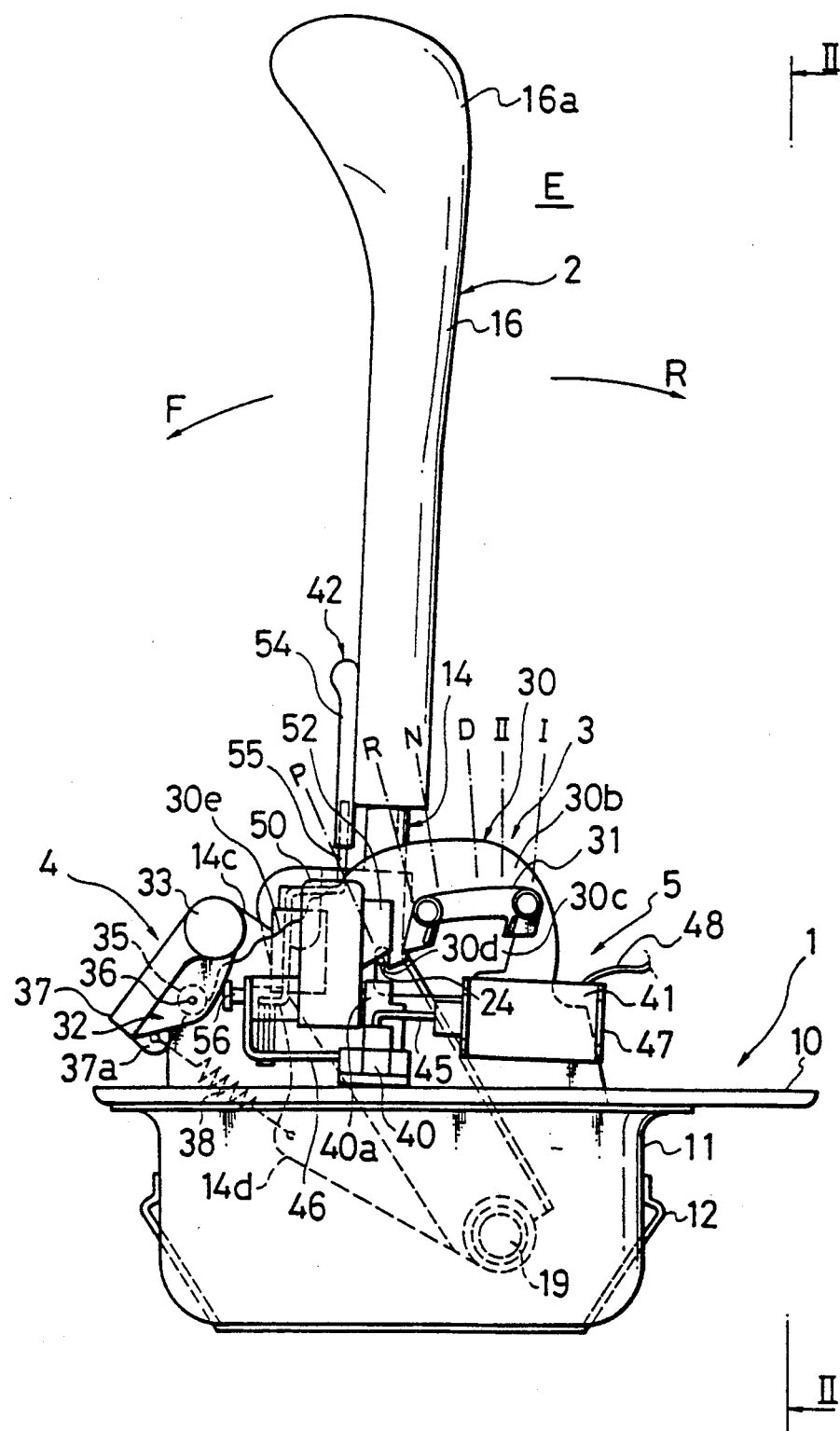
FIG. 1 shows a side view of a control device for an automatic transmission according to this invention.
Figure 2:
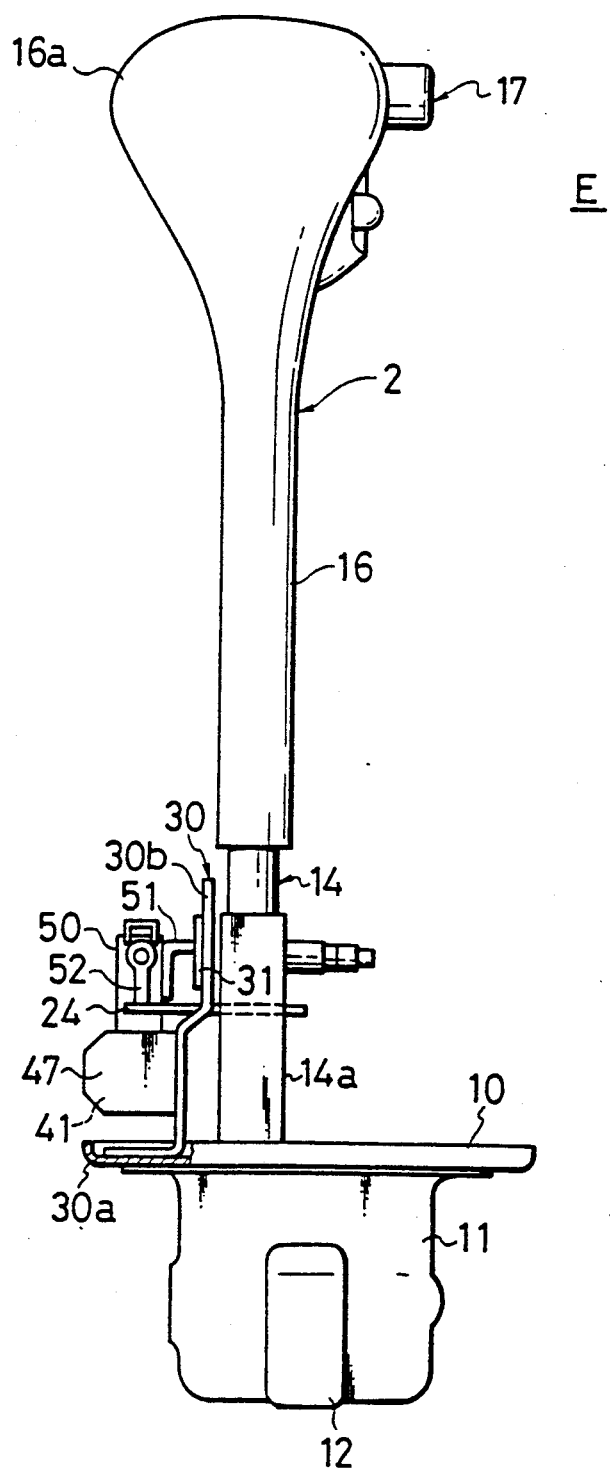
FIG. 2 is a view taken in the direction of the arrows along the line II—II in FIG. 1.

Referring to FIGS. 1 and 2, a control device for automatic transmission E comprises a base member 1 mounted on a vehicle body, a shift lever 2 pivotably supported by the base member, a guide structure 3 for guiding the shift lever 2, a check structure 4 for moderating motion of the shift lever 2, and a shift-locking device 5 for locking the shift lever 2.

The base member 1 is provided with a base bracket 10 which supports the shift lever 2, the guide structure 3, the check structure 4, and the shift-locking device 5. The base bracket 10 is covered by a cover member 11 at the under portion of the base bracket 10. The cover member 11 is secured to the lower side of the base bracket 10. A heat resisting member 12 preferably made of metal plate is attached to the cover member in a freely removable manner.

Figure 3:
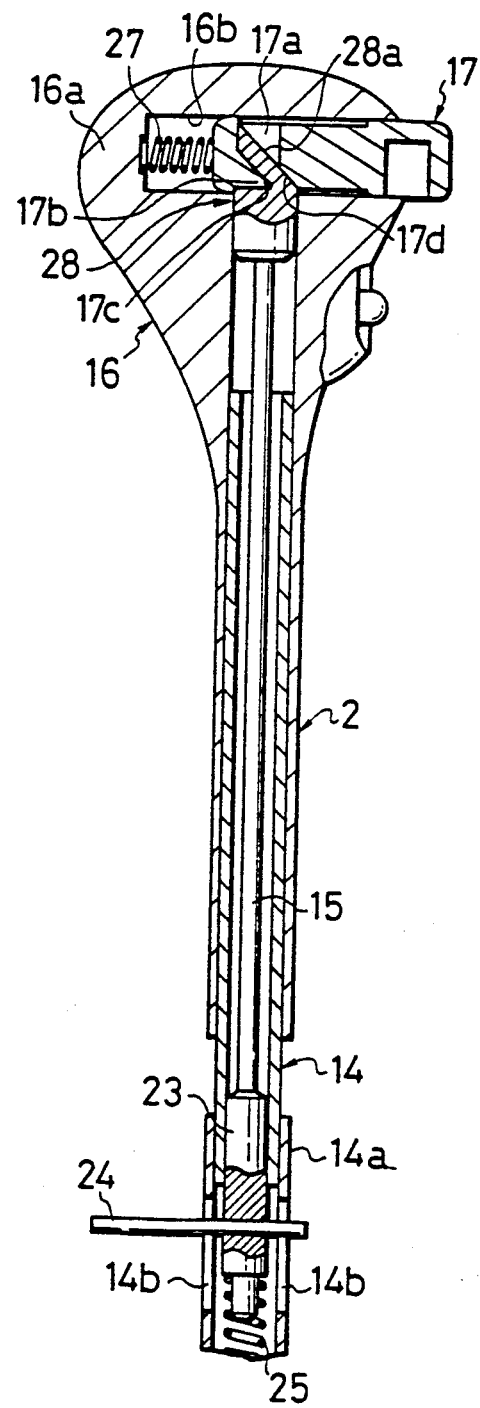
FIG. 3 is a vertical sectional view of the shift lever shown in FIG. 2.

The shift lever 2, as shown in FIGS. 1 to 3, comprises a control lever 14 pivotably supported by the base bracket 10, a compression rod 15 slidably positioned inside the control lever (14), a knob 16 attached to the peripheral surface of the control lever 14, and a knob button 17 inserted in the upper portion of the knob 16 in a slidable manner in the horizontal direction.

Figure 4:
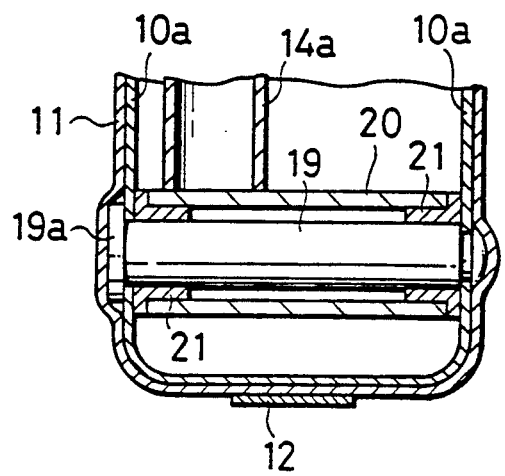
FIG. 4 is a sectional view of a base portion of the shift lever shown in FIG. 1.

The control lever 14 is provided with a bracket 14a at the lower portion thereof, which is rotatably supported by the base bracket 10 through a pivot shaft 19 as shown in FIG. 4. The cross-section of the bracket 14a is U-shaped. The base bracket 10 is provided with a control lever mounting portion 10a downwardly extending from the base bracket 10 and formed in a boxy shape with an opening at the upper portion. The lower end of the bracket 14a is inserted into the opening of the control lever mounting portion 10a and the lower tip of the bracket 14a is welded to a pipe 20 positioned in the horizontal direction.

A pair of bushings 21, 21 made of synthetic resin are forcedly inserted into both sides of the pipe 20. The pivot shaft 19 with a head 19a is inserted into the bushings 21, 21 from one side of the control lever mounting portion 10a and the tip of the pivot shaft 19 is caulked, whereby the control lever 14 can swing in the front and rear direction (in the F-R direction in FIG. 1) about the pivot shaft 19.

The control lever 14 is formed as a pipe structure and contains a positioning pin mounting member 23 in a freely slidable manner in the vertical direction. The positioning pin mounting member 23 is secured to the lower portion of the compression rod 15 and is pierced by a positioning pin 24 as a positioning member in the horizontal direction. The bracket 14a of the control lever 14 is provided with a pair of guide slots 14b, 14b extending in the axial direction. The guide slots 14b, 14b are positioned one at each side of the positioning pin mounting member 23. The positioning pin 24 is extended through the pair of guide slots 14a in the horizontal direction and is secured to the positioning pin mounting member 23, whereby the positioning pin 24 can move along the pair of guide slots 14b, 14b in the axial direction of the control lever 14. The compression rod 15 is pressed in the upper direction by a compression spring 25 through the positioning pin mounting member 23 at all times.

The knob 16 is, as shown in FIG. 3, provided with a head portion 16a on the upper portion and the head portion 16a is provided with a lateral hole 16b. The knob button 17 is slidably inserted into the lateral hole 16b from the outside. The knob button 17 is pressed toward the outside of the lateral hole 16b by a compression spring 27 accommodated in the lateral hole 16b, so that the tip of the knob button 17 projects out of the lateral hole 16b.

The knob button 17 is provided with a recess 17a in the head portion 16a and has a projecting portion 17b in the recess 17a. The recess 17a has an opening 17c at the under side and a cam member 28 is inserted into the opening 17c from the underside thereof. The cam member 28 is engaged by the projecting portion 17b and is secured to the upper end of the compression rod 15. The cam member 28 has a slope 28a contacting a slope 17d of the knob button 17, whereby when the knob button 17 is pressed into the lateral hole 16b, the cam member 28 is released from the projecting portion 17b and moves downward as the knob button 17 moves inward, and consequently, the positioning pin 24 moves downward along the guide slots 14b, 14b with the compression rod 15.

The guide structure 3 is provided with a positioning plate 30 as a guide member for engaging the positioning pin 24 of the shift lever 2 and keeping the shift lever 2 in a parking position or a moving position. The positioning plate 30 is formed substantially in an L-shape in section and comprises a horizontal portion 30a secured to the base bracket 10 and a vertical portion 30b having an engaging opening 30c in the relatively rear portion. The positioning plate 30 is provided with a parking position and a plurality of moving positions, i.e. parking (P), reverse (R), neutral (N), drive (D), second (II) and first (I) in the shift direction, i.e. front and rear direction of the vehicle.

The positioning plate 30 has a parking positioning recess 30d at the position corresponding to the parking position and is mounted with a buffer member 31 for absorbing the shock when the positioning pin 24 contacts the buffer member 31. The buffer member 31 is positioned in the position corresponding to the moving position. The buffer member 31 is made of synthetic resin and is formed in a reversed U-shape. For example, polyester elastomer, which has excellent elasticity and durability and is resistant to oil, is used as the synthetic resin. The buffer member 31 comprises a pair of circular arc sections 31a, 31b at the front corresponds to the axis of the pivot shaft 19. The buffer member 31 is provided with a pair of inner side sections 31c, 31d which the positioning pin 24 contacts when the positioning pin 24 is positioned in the N and II positions. The inner side sections 31c, 31d respectively lead to the circular arc sections 31a, 31b and are connected to one another by a connecting section 31e which does not contact the positioning pin 24. The buffer member 31 is provided with a pair of slots 31f, 31g for buffering the shock when the positioning pin 24 contacts the inner side sections 31c, 31d. The slots 31f, 31g are respectively positioned close to and along the inner side sections 31c, 31d. In addition, the buffer member 31 may be formed by insert molding in the positioning plate 30.

According to this structure of the buffer member 31, a knocking noise from the positioning pin 24 is effectively absorbed when the shift lever 2 is shifted to each of the moving positions R, N, II and I.

The check structure 4 is provided with the positioning plate 30 as a check member. The check structure has six check recesses 30e on the positioning plate 30 and a check arm 32 selectively contacting the check recesses 30e. The check recesses 30e are formed on a circular arc surface, of which the central point corresponds to the axis of the pivot shaft 19, formed on the peripheral surface at the front F side of the vertical section 30b of the positioning plate 30. The six check recesses 30e correspond to the each of the positions P, R, N, D, II and I from the front F toward the rear R.

Figure 5:
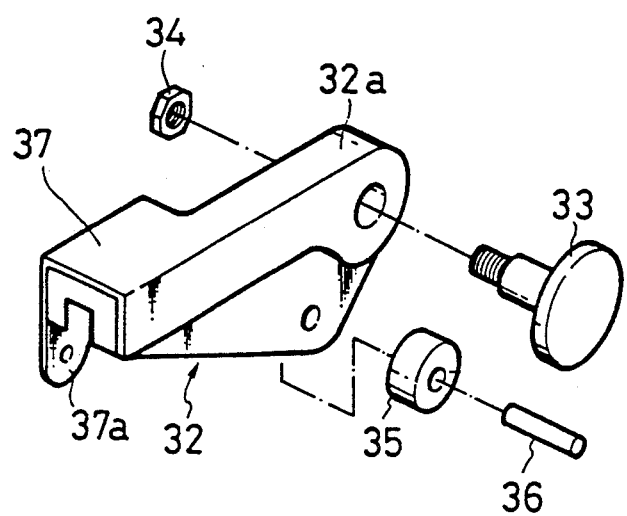
FIG. 5 is an enlarged view of a buffer member which constitutes the control device of FIG. 1.
Figure 6:
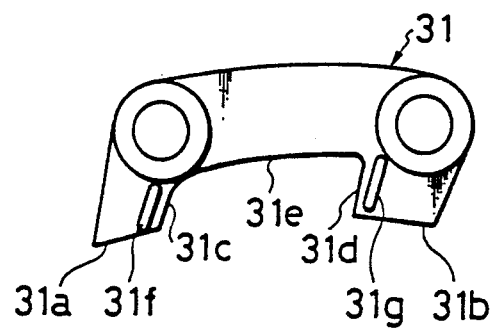
FIG. 6 is an exploded view of a check arm which constitutes the control device of FIG. 1.

The check arm 32 is made of synthetic resin and, as shown in FIG. 5, is pivotably supported at the base 32a by the front F side free end 14c of the bracket 14a of the control lever 14 by means of a mounting bolt 33 and a nut 34. A contacting roller 35 made of synthetic resin is rotatably supported by the check arm 32 through a pin 36. In addition, a mounting pin may be used and be caulked at the tip instead of the mounting bolt 33.

A reinforcement cover 37 made of metal plate is attached to the check arm 32 for reinforcing the check arm 32. One end of a tension spring 38 engages a tab 37a of the reinforcement cover 37 and the other end engages a front F end 14d of the bracket 14a so as to press the contacting roller 35 of the check arm 32 into the check recesses 30e.

The shift-locking device 5 comprises a rotary bushing 40 pivotably supported by a member other than the shift lever 2, a shift-lock solenoid 41 for rotating the rotary bushing 40 and a manual shift-lock release device 42 for releasing the shift lever 2 from the shift-lock condition.

Figure 7:
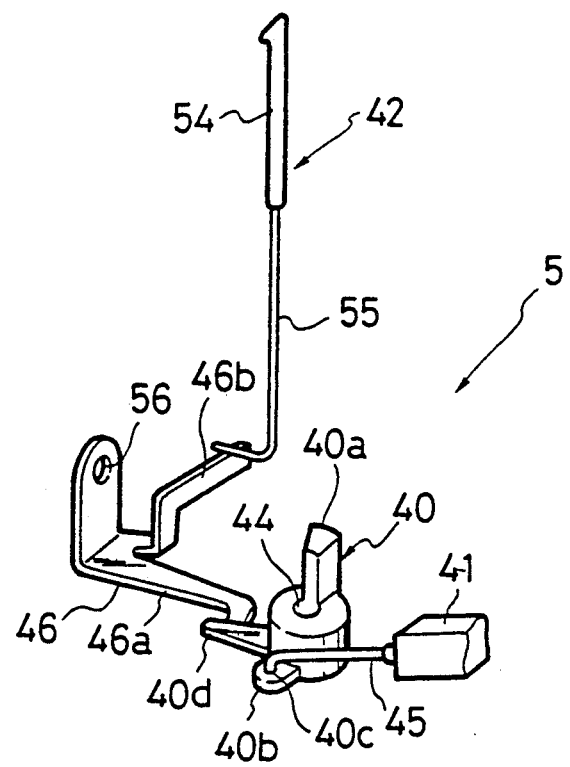
FIG. 7 is a perspective view explaining the relationship between a rotary bushing and a shift-lock solenoid.

The rotary bushing 40 is made of synthetic resin and, as shown in FIG. 7, is pivotably supported by a member other than the shift lever 2, for example the horizontal portion 30a of the positioning plate 30 directly under the parking positioning recess 30d, by a pivot shaft 44. A projecting part 40a is mounted on the rotary bushing 40. The projecting part 40a is positioned right under the positioning pin 24 engaged with the parking positioning recess 30d for preventing the positioning pin 24 from disengaging from the parking positioning recess 30d. A tab 40b is mounted on the peripheral surface of the rotary bushing 40. The tab 40b has a insertion hole 40c for inserting the tip of a plunger 45 extending from the shift-lock solenoid 41. A lever part 40d for contacting an arm 46a of a link lever 46 of the manual shift-lock release device 42 is mounted on the peripheral surface of the rotary bushing 40.

The shift-lock solenoid 41 is positioned in a portion on the base bracket 10. For example, the shift-lock solenoid 41 is mounted on the positioning plate 30 through a bracket 47. The plunger 45 is always pressed toward the tip thereof by a compression spring not shown in the figure. The shift-lock solenoid 41 is connected to a power source through a wire 48.

A parking switch 50 is mounted on the positioning plate 30 through a bracket 51. The parking switch 50 has a detecting element 52 for contacting the positioning pin 24 and detecting the shift lever 2 shifted to the P position.

The manual shift-lock release device 42 is mounted on the shift lever 2 and is provided for releasing the shift lever 2 from the shift-lock by pressing a manual knob 54 when the shift-lock solenoid 41 cannot work because of a power failure. The manual knob 54 is connected to a release lever 55 contacting another arm 46b of the link lever 46. The link lever 46 is pivotably supported by a pivot shaft 56 so as to pivot on the pivot shaft 56 by pressing the arm 46b through release lever 55 and to press the lever part 46 by the arm 46a for pivoting the rotary bushing 40 to move the projecting part 40a from the position directly under the positioning pin 24 engaged with the parking positioning recess 30d.

According to the construction of the control device for an automatic transmission described above, when the shift lever 2 is positioned in P position as shown in FIG. 1, the positioning pin 24 engages the parking positioning recess 30d of the positioning plate 30 and the projecting part 40a of the rotary bushing 40 is positioned directly under the positioning pin, whereby the descent of the positioning pin 24 is blocked to shift-lock the shift lever 2. In addition, the contacting roller 35 of the check arm 32 is pressed and engages the check recess 30e corresponding to the P position of the positioning plate 30 by the spring force of the tension spring 38.

When the shift lever 2 is shifted from P position to for example R position, first of all the brake pedal is depressed. Then, the shift-lock solenoid 41 is energized to withdraw the plunger 45 against the spring force of the compression spring. As a result, the rotary bushing 40 is pivoted to move the projecting part 40a to the outside of the locus of motion of the positioning pin 24.

Next, when the knob button 17 is pressed, the positioning pin 24 is disengaged from the parking positioning recess 60d through the cam member 28 and the compression rod 15, so that shift lever 2 may be shifted to the rear R side. Then, when the positioning pin 24 reaches the R position, the pressure on the knob button 17 is released and, as a result, the positioning pin 24 is raised by the restoring force of the compression spring 25 and engages the circular arc section 31a. Next, when the brake pedal is released the energization of the shift-lock solenoid 41 is cancelled to project the plunger 45 by restoring force of the compression spring, so that the rotary bushing 40 is pivoted to position the projecting part 40a directly under the parking positioning recess 60d. In addition, the contacting roller 35 of the check arm 32 engages the check recess 30e corresponding to the R position.

When the shift lever 2 is shifted from this condition to the P position again, the knob button 17 is pressed to disengage the positioning pin 24 from the circular arc section 31a, and the shift lever 2 is shifted to the front F side. Then, the projecting part 40a of the rotary bushing 40 is moved from directly under the parking positioning recess 30d from pressure by the positioning pin 24. Then, when the shift lever 2 reaches the P position, the pressure to the knob button 17 is released to raise the positioning pin 24 by the spring force of the compression spring 25 and to engage the positioning pin 24 in the parking positioning recess 30d. At the same time, the engagement between the positioning pin 24 and the projecting part 40a of the rotary bushing 40 is released, so that the rotary bushing 40 is pivoted to position the projecting part 40a directly under the positioning pin 24. Consequently, the shift lever 2 is again shift-locked.

When the shift lever 2 is shifted from the R position to the N, D or II position, the shift lever 2 may be shifted by simply moving the shift lever 2 to rear R side and stopping the shift lever 2 in the intended position. In addition, when the shift lever 2 is shifted to the I position, the knob button 17 is pressed as described above, then the shift lever 2 can move to rear R side, and the pressure on the knob button 17 is released when the positioning pin 24 reaches the I position.

Now, the rotary bushing 40 is mounted, not on the shift lever 2 as a movable member but on the positioning plate 30 as a fixed member, so that the inside diameter of the rotary bushing 40 may be small, namely the diameter of the pivot shaft 44 working as pivot of the rotary bushing 40 may be small to reduce the rotary friction, as a result the rotary bushing 40 may be prevented from producing operating noise and a working defect resulting from wobble when shift-locking.

Moreover, because the diameter of the pivot shaft 44 may be small, it is not necessary for the plunger 45 of the shift-lock solenoid 41 to move to the limit of the working stroke to pivot the rotary bushing 40 by a required amount. Because the mounting space of the shift-lock solenoid 41 need not be large, it is very easy to adjust the mounting position of the shift-lock solenoid 41.

Further, the shift-lock solenoid 41 is mounted on the base bracket 10, for example the positioning plate 30, so that the wire 48 may be as short as possible and the number of clips for fastening the wire 48 may be small, and consequently the production costs may be reduced. In addition, because the working space of the shift-lock solenoid 41 is not especially required, the whole device can be small.

Moreover, the buffer member 31 is made of synthetic resin, so that a shock between the positioning pin 24 and the buffer member 31 when shifting the shift lever may be absorbed by the buffer member. As a result, the positioning pin 24 and the buffer member 31 are prevented from producing a noise by metallic contact and the driver is prevented from becoming distracted by the noise. In addition, the buffer member 31 is provided with the slots 31f, 31g positioned close to and along the inner side sections 31f, 31g, so that the inner side sections 31f, 31g are temporarily bent when the positioning pin 24 contact the inner side sections 31f, 31g, then the inner side sections 31f, 31g regain their original shape. As a result, the buffer member 31 is prevented from producing hitting marks by the positioning pin 24.

Furthermore, the check arm 32 and the contacting roller 35 are made of synthetic resin, so that when the contacting roller 35 contacts the check recess 30e, a driver is prevented from being distracted by the noise produced by metallic contact.

What is claimed is:

1. A control device for an automatic transmission, comprising;
   a base member for mounting on a vehicle body;
   a shift lever pivotably supported at one of its ends by said base member,
   a positioning member movable substantially parallel to the longitudinal axis of said shift lever;
   a guide structure for guiding said shift lever, comprising a guide member having a parking position part and a moving position part for engaging said positioning member so as to guide said positioning member, said guide member provided at the moving position part with a buffer member for absorbing a shock when coming in contact with said positioning member, said guide member mounted on said base member;
   a check structure for moderating motion of said shift lever, comprising a check member and a check arm contacting said check member, said check member mounted on said base member, said check arm pivotably mounted on said shift lever and urged to said check member; and
   a shift-locking device for locking said shift lever, comprising a rotary bushing for blocking disengagement of said positioning member from said parking position part, said rotary bushing pivotably mounted on a fixed member other than said shift lever, and a shift-lock solenoid for pivoting said rotary bushing when releasing said shift lever from a locked condition, said shift-lock solenoid being mounted on a fixed part on said base member.

2. The control device for an automatic transmission according to claim 1, wherein said guide member and said check member are formed as an integrated body.

3. The control device for an automatic transmission according to claim 2, wherein said guide member and said check member includes a plate member.

4. The control device for an automatic transmission according to claim 1, wherein said rotary bushing is mounted on said base member.

5. The control device for an automatic transmission according to claim 1, wherein said base member has a base bracket and said rotary bushing is mounted on the base bracket.

6. The control device for an automatic transmission according to claim 1, wherein said shift-lock solenoid is mounted on said base member.

7. The control device for an automatic transmission according to claim 1, wherein said base member has a base bracket and said shift-lock solenoid is mounted on the base bracket.

8. The control device for an automatic transmission according to claim 3, wherein said plate member is mounted on said base member and said shift-lock solenoid is mounted on said plate member.

9. The control device for an automatic transmission according to claim 1, wherein said guide member includes a plate member, and said buffer member is made of synthetic resin and is positioned on a contact side with said positioning member in said moving position part.

10. The control device for an automatic transmission according to claim 1, wherein said check arm is made of synthetic resin, and has a contact member made of synthetic resin and a reinforcement member.

11. A control device for an automatic transmission, comprising;
   a base member for mounting on a vehicle body;
   a shift lever pivotably supported at one of its ends by said base member;
   a positioning member movable substantially parallel to the longitudinal axis of said shift lever;
   a guide structure for guiding said shift lever, comprising a guide member having a parking position part and a moving position part for engaging said positioning member so as to guide said positioning member, said guide member provided at the moving position part with a buffer member for absorbing a shock when coming in contact with said positioning member, said guide member mounted on said base member;

a check structure for moderating motion of said shift lever, comprising a check member and a check arm contacting said check member, said check member mounted on said base member, said check arm pivotably mounted on said shift lever and urged to said check member; and a shift-locking device for locking said shift lever, comprising a rotary bushing for blocking disengagement of said positioning member from said parking position part, said rotary bushing pivotably mounted on a fixed member other than said shift lever, and a shift-lock solenoid for pivoting said rotary bushing when releasing said shift lever from a locked condition, said shift-lock solenoid being mounted on a fixed part on said base member, wherein said guide member includes a plate member, and said buffer member is made of synthetic resin and is positioned on a contact side with said positing member in said moving position part.

12. The control device for an automatic transmission according to claim 11, wherein said buffer member has a slot for buffering a shock when said positioning member contacts said buffer member.

13. The control device for an automatic transmission according to claim 12, wherein said slot is positioned close to and along a contact side of said buffer member.

14. A control device for an automatic transmission, comprising;

a base member for mounting on a vehicle body;

a shift lever pivotably supported at one of its ends by said base member, a positioning member movable substantially parallel to the longitudinal axis of said shift lever;

a guide structure for guiding said shift lever, comprising a guide member having a parking position part and a moving position part for engaging said positioning member so as to guide said positioning member, said guide member provided at the moving position part with a buffer member for absorbing a shock when coming in contact with said positioning member, said guide member mounted on said base member;

a check structure for moderating motion of said shift lever, comprising a check member and a check arm contacting said check member, said check member mounted on said base member, said check arm pivotably mounted on said shift lever and urged to said check member; and a shift-locking device for locking said shift lever, comprising a rotary bushing for blocking disengagement of said positioning member from said parking position part, said rotary bushing pivotably mounted on a fixed member other than said shift lever, and a shift-lock solenoid for pivoting said rotary bushing when releasing said shift lever from a locked condition, said shift-lock solenoid being mounted on a fixed part on said base member, wherein said check arm is made of synthetic resin, and has a contact member made of synthetic resin and a reinforcement member.

15. The control device for an automatic transmission according to claim 14, wherein said contact member includes a contact roller and said reinforcement member includes a metal reinforcement cover.

* * * * *